United States Patent [19]

Harold-Barry

[11] Patent Number: 5,995,462
[45] Date of Patent: Nov. 30, 1999

[54] METHOD AND APPARATUS FOR READING DATA FROM A DISC CARRIER

[75] Inventor: John A. Harold-Barry, Southampton, United Kingdom

[73] Assignee: U.S. Philips Corporation, New York, N.Y.

[21] Appl. No.: 08/897,186

[22] Filed: Jul. 21, 1997

[30] Foreign Application Priority Data

Jul. 20, 1996 [GB] United Kingdom .................. 9615279

[51] Int. Cl.⁶ .................................................. G11B 7/00
[52] U.S. Cl. .............................................................. 369/54
[58] Field of Search ................................ 369/54, 58, 60, 369/47, 48, 46.32

[56] References Cited

U.S. PATENT DOCUMENTS

| | | | |
|---|---|---|---|
| 4,796,247 | 1/1989 | Vogelsang | 369/44 |
| 5,042,023 | 8/1991 | Yokota | 369/47 |
| 5,212,678 | 5/1993 | Roth et al. | 369/60 |
| 5,457,672 | 10/1995 | Shinada et al. | 369/60 |
| 5,528,570 | 6/1996 | Kondo | 369/60 |
| 5,621,712 | 4/1997 | Nonaka | 369/60 |

FOREIGN PATENT DOCUMENTS

| | | |
|---|---|---|
| 0407573B1 | 1/1991 | European Pat. Off. . |
| 0429139A1 | 5/1991 | European Pat. Off. . |
| 0523985A2 | 1/1993 | European Pat. Off. . |
| 0550097A2 | 7/1993 | European Pat. Off. . |
| WO9111002 | 7/1991 | WIPO . |
| WO9111003 | 7/1991 | WIPO . |

*Primary Examiner*—Thang V. Tran
*Attorney, Agent, or Firm*—Michael E. Belk

[57] ABSTRACT

A method of retrieving data from a record carrier disc having rotary information tracks on which the data is recorded. A read head reads data from the tracks into a buffer memory, from which it is supplied to an output terminal. This permits continuous playback of the recorded information during temporary intervals when, due to mechanical shocks, the read head becomes misaligned relative to the tracks. After such a misalignment the read head becomes realigned at a subsequent track position, and as soon as data is again being correctly detected it is written into the buffer memory in a location therein which leaves a gap between the currently written data and that written before the shock occurred. When the disc rotation brings the read head into radial alignment with the position where the shock commenced, the read head is moved inward to return to that position and the gap in the buffer memory is filled by reading from the disc the data which was missed during the misalignment following the shock. The method is applicable to a shock FIFO memory for a CD audio player.

13 Claims, 2 Drawing Sheets

METHOD AND APPARATUS FOR READING DATA FROM A DISC CARRIER

FIELD OF THE INVENTION

The invention relates to the field of disk for information reproduction, and is most closely related to the field of disk drive mechanical shock recovery.

BACKGROUND OF THE INVENTION

The invention relates to a method of reading data from a disc carrier and applying the data to an output comprising the steps of;

i) reading data from the disc and writing it into a buffer memory,
ii) reading the data stored in the buffer memory to the output at a first given data rate,
iii) detecting any interruption in the reading of data from the disc to the buffer memory, and
iv) reading data from the disc at a second given data rate which is higher than the first given data rate after an interruption in reading data from the disc to the buffer memory, in order to restore the quantity of data in the buffer memory to a given level to thereby enable uninterrupted reading of data to the output in the presence of shocks which cause a temporary interruption of the reading of data from the disc to the buffer memory.

The invention further relates to an arrangement for reading data from a rotating disc carrier, said arrangement including a shock compensation memory for providing output data when a reading head becomes misaligned with respect to information tracks on the disc. The said arrangement also comprises means for realigning the reading head at a later location on the track, means for detecting when the disc has rotated to a position where the reading head is located radially aligned with but outside the position at which misalignment occurred, means for causing the reading head to move inward one or more track(s) so that it regains the position at which the misalignment occurred, and means for causing data to be written into the memory at a rate greater than that at which it is being read out until the memory becomes substantially full.

Such a method and arrangement has been disclosed, inter alia, in U.S. Pat. No. 4,796,247, EP-A-0 429 130, EP-A-0 550 097, WO91/11002 and WO91/11003. In all these documents a buffer memory is provided so that a continuous output of data can be obtained when mechanical shocks occur which cause the reading head to become temporarily misaligned with the data track on the disc. Thus by reading out the data from the buffer memory the effect of a limited duration shock on the output can be eliminated, i.e as far as a listener to a compact disc player is concerned the shock has no effect on the output.

In order to achieve this result data is read from the disc and written into the buffer memory at a higher rate, for example twice, than that at which it is read out from the buffer memory. It is possible to read the data from the disc continuously at the higher rate, to interrupt this reading when the buffer memory is about to overflow, and restart the reading when the buffer memory empties to a predetermined state, as disclosed in EP-A-0 429 139. Alternatively, the data may normally be read from the disc at the same rate as it is read from the buffer memory, the buffer memory being initially filled before output begins and then in the case of the buffer emptying, because of an interruption of reading data from the disc due to head misalignment caused by a mechanical shock, the rate of reading of the data is increased (doubled) until the buffer memory is re-filled. Once the buffer memory is full the rate of reading the data from the disc is restored to the original rate. This has the disadvantage, however, that the speed of rotation of the disc has to be changed.

The duration of a shock which can be compensated by such an arrangement is, of course, limited by the capacity of the buffer memory, i.e the maximum length shock which can be compensated corresponds to the time taken to read out all the data in the buffer memory. Additionally, a series of shorter shocks may also exceed the memory capacity if there is insufficient time between the shocks to re-fill the buffer memory, i.e as the frequency and number of shocks increase the buffer memory is progressively emptied. Successive shocks may occur, for example when the arrangement is used in a personal CD player which may be worn by the user whilst jogging or taking part in other physical activities. Another circumstance which can give rise to successive shocks is use in a car or other vehicle.

The above citations are hereby incorporated in whole by reference.

SUMMARY OF THE INVENTION

One object of the invention is to enable the provision of a compact disc player in which for a given buffer memory size a greater immunity to successive shocks than is available with current compact disc players may be achieved. Alternatively, a smaller buffer memory could enable the same successive shock protection as in current compact disc players to be obtained.

The invention provides a method as set forth in the opening paragraph comprising the further steps of:

v) reading data from a position on the disc subsequent to the point at which the shock occurred, and writing it into the buffer memory, as soon as it becomes available after an interruption, and
vi) reading data from the buffer memory to the output in the same order as it is stored on the disc carrier.

By reading the data as soon as it becomes available after a shock, i.e as soon as the reading head has recovered to a position on the track on the disc after the point at which the shock occurred, and writing it into an appropriate location in the buffer store, rather than waiting until the disc has completed a full revolution so that the reading head is in the same radial position relative to the disc as it was when the shock commenced, it is possible to reduce the time during which data is being read from the disc but is already stored in the buffer memory. It will be appreciated that in the prior art solution where the reading head is restored to a point on the track prior to that at which the shock occurred, there is an effective minimum duration for each shock of the time taken for a disc to rotate through one whole revolution, which particularly towards the outside of the disc is a relatively long time. If a further shock occurs towards the end of that time a further full revolution of the disc has to take place before re-filling of the buffer memory commences. All this time, of course, data is being read out from he buffer memory and consequently repetitive shocks can quickly empty the buffer memory after which the music output is interrupted to the annoyance of the user. By utilising the time between recovery of the reading head onto the track and the rotation of the disc to the point at which the shock occurred to fill the buffer memory, the speed at which it empties is reduced and consequently a CD player can tolerate a longer series of repetitive shocks before the output is interrupted.

Step i) of the method may be carried out at said second given data rate, the method then comprising the further steps of;

vii) interrupting the writing of data to the buffer memory when the quantity of data in the buffer memory reaches a first level where the buffer memory is substantially full, and viii) resuming the writing of data into the buffer memory when the quantity of data in the buffer memory falls to a second lower level.

By continuously reading data from the disc at the higher data rate the disc can be rotated at a constant linear velocity, i.e the velocity of the disc past the head, the angular velocity varying as the head moves radially across the disc. The rate at which data is read from the disc is, of course, determined by the velocity with which the disc passes the reading head. The interruptions will last a multiple of one revolution of the disc with the reading head being moved in one track as each revolution is completed so that it regains the position at which data was last read out.

The method may comprise the further step of controlling a write address generator for writing the data into the buffer memory in such a manner that the data is written into selected locations in the buffer memory, the selected locations being such that when data is read out of the buffer memory using sequential addresses the data is in the same order as it appeared on the disc.

It is, of course, necessary that data is read out from the buffer memory in the correct order, that is for an audio compact disc the data should arrive at the output in the same order as it was pressed into the disc, at least during the playing of a single track, otherwise the music will be distorted. This can in principle be achieved by using either the write address generator or the read address generator. That is the write addresses can be modified enabling a sequential reading of the data or the data can be written sequentially and the jumps in reading the data from the disc can be stored and used to control the read address generator accordingly.

The further step may comprise causing a write address generator to increment addresses during the period that data read from the disc is interrupted to create a gap in the addressing sequence which creates a space for insertion of the data which was lost during the interruption.

This is a convenient way of creating spaces in the memory for later filling and will consequently enable sequential locations in the memory to be written with sequential data from the disc even though the data is not read from the disc sequentially when recovering from a shock.

The invention further provides an arrangement for reading data from a rotating disc carrier, the arrangement being as set forth in the second paragraph and further comprising means for writing data from the disc into the memory during at least part of a first period between the instant when the reading head is realigned and the instant when the reading head is moved to the point at which the misalignment occurred.

Such an arrangement has the advantage that data can be read from the disc and written into the buffer memory from the time that shock recovery is achieved and it is not necessary to wait until the disc rotates so that the point at which the shock commenced is once again adjacent to the head. This minimises the time when no data is being written into the buffer store and consequently allows the use of a smaller buffer memory for a given repetitive shock immunity or gives a greater immunity to repetitive shocks if the same size memory as the prior art arrangement is used.

The means for writing data from the disc into the memory may include a write address generator arranged to write data into memory locations, the write address generator being arranged to skip a set of locations in the memory to accommodate the data to be read from the disc in a second period starting when the head is re-aligned with the position on the disc where the original misalignment occurred and ending when the reading head reaches the position where the first period started.

The arrangement may comprise a read address generator for reading data from the memory locations, the read address generator being arranged to read sequential locations of the memory so that data is read from the memory in the same order as it is arranged on the disc.

Such an arrangement may be used with many different types of apparatus in which data is read from a disc. Examples are CD-Audio players, particularly personal players and in-car players, CD-Video, CD ROM, DVD all of which are optically encoded. It could equally be used with magnetically coded media such as hard or floppy disc readers as used in computers or with magneto optic re-recordable discs.

Those skilled in the art will understand the invention and additional objects and advantages of the invention by studying the description of preferred embodiments below with reference to the following drawings which illustrate the features of the appended claims:

DETAILED DESCRIPTION OF THE PREFERRED EMBODIMENT

Figure 1:
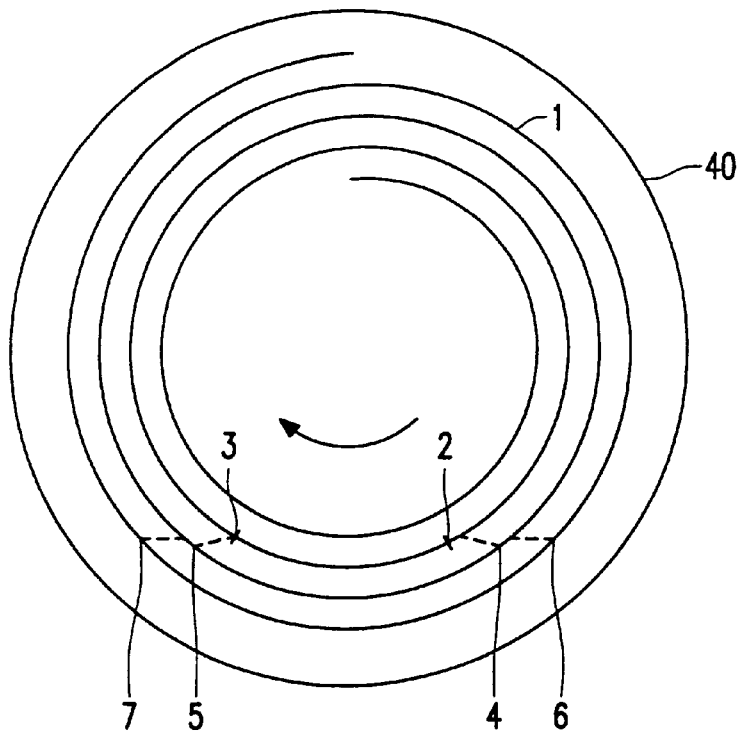
FIG. 1 shows a disc carrier in the form of a compact disc.
Figure 2:
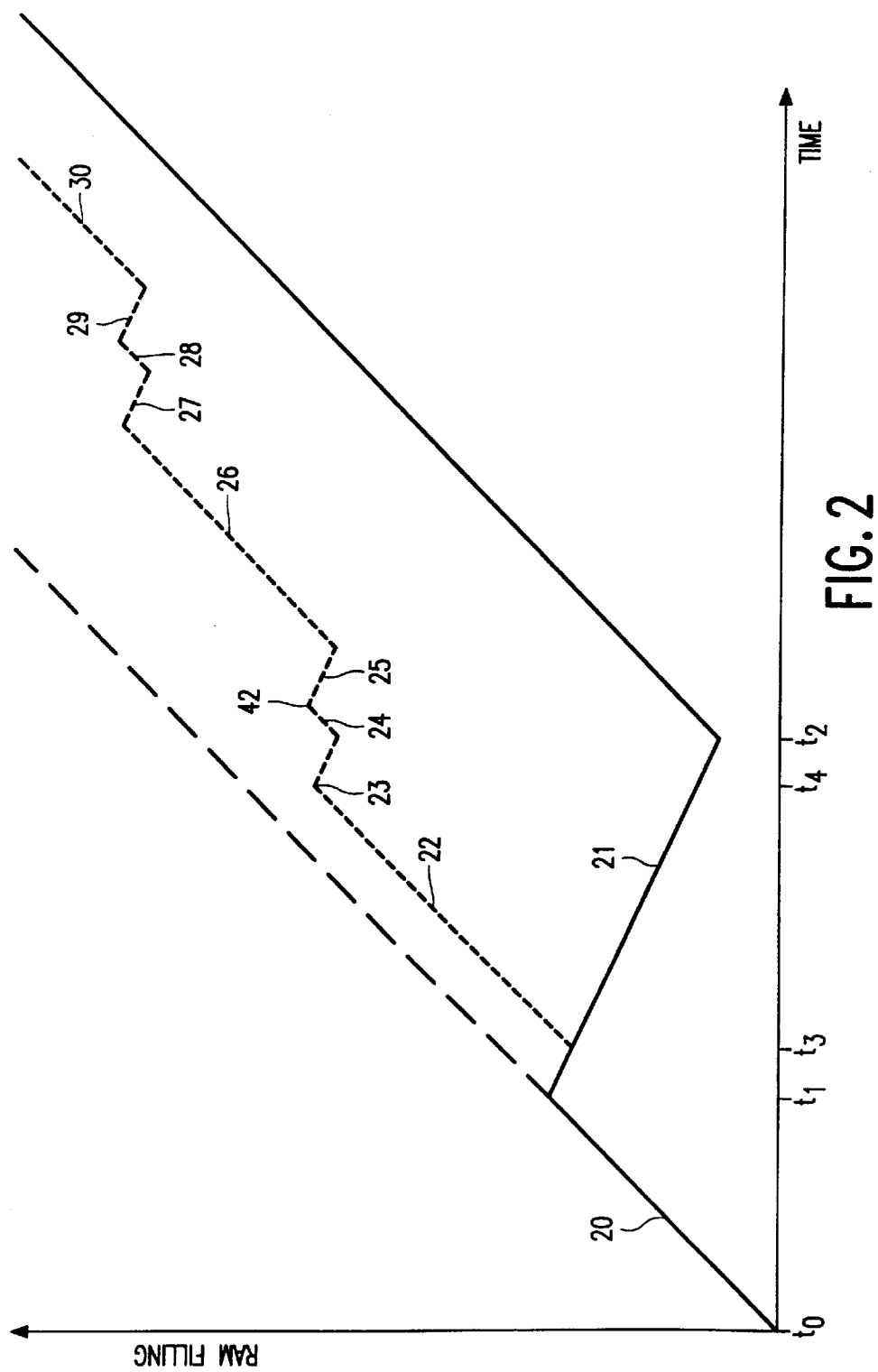
FIG. 2 illustrates the method of filling the buffer memory according to the invention.

FIGS. 1 and 2 illustrate a method of filling a buffer store with data recovered from a rotating disc storage medium, for example a compact disc, according to the invention. FIG. 1 represents a spiral track 1 on a compact disc which contains the data, for example audio tracks together with time code and error correction codes, to be read out by in this example a laser reading head. FIG. 2 illustrates how the data is entered into the buffer store.

It is assumed that the data is being read out correctly and loaded into the buffer store until the reading head reaches the point 2 on the spiral track 1. At this point a shock occurs which causes misalignment between the reading head and the track on the disc. The occurrence of this shock may be detected as described in U.S. Pat. No. 4,796,247. When the shock occurs valid data is no longer read out from the disc and consequently there is no data available to be written into the buffer store. This is illustrated in FIG. 2 where the ordinate represents an increasing quantity of data stored in the buffer store and the abscissa represents time. Thus starting from time $t_0$ at the start of the track 1 the buffer store is steadily filling until time $t_1$, which corresponds to the time that the reading head reaches position 2 on the track 1. At that time data ceases to be available and since data is being read out from the buffer store the buffer store starts to empty. In a conventional shock buffer the buffer store will continue to empty until the reading head recovers to the position 2 on the track 1 which will be determined by the time taken for the disc to rotate one revolution. Thus the buffer store will then commence refilling at time $t_2$. This, of course, assumes that the shock duration plus recovery time is less than the time for one revolution of the disc, which in this example it is. Similar considerations apply, however, even if the shock lasts longer than the time taken for one revolution of the disc as the shock duration is unlikely to be an integer multiple of the disc rotation period.

In the example shown the reading head recovers from the shock at position 3 on the track 1. It should be noted that in the method according to the invention the reading head is recovered at a position, point 3, on the disc in advance of where the shock position is agian reached, whereas in the prior art the head is not recovered until a point on the track at the shock position 2 and so until the disc rotates so that the reading head reaches position 2 data that is read from the disc has already been stored in the buffer memory. As a result of recovering the head at a position in advance of the shock position, data is now being read from the disc which has not yet been stored in the buffer memory. It is, of course, necessary to move the reading head inward radially by one track slightly in advance of the disc rotation to the position 2. This is illustrated by the dotted line extending from position 4 on the disc in FIG. 1.

The present description assumes that the period of the shock is less than the time taken for one revolution of the disc. If, however, the shock lasts for longer than the time taken for one revolution of the disc (which will be comparatively short when the reading head is reading data from tracks near to the centre of the disc) then the reading head is recovered at a position on the disc which is where it would have reached if the shock had not occurred, which may be two or more tracks outside the position where the shock commenced. It is not, however, essential that the reading head is recovered to that position, merely that it is in advance of the shock start position, but it does simplify the address generation for the buffer memory if this strategy is adopted.

It will be apparent that valid data which has not already been written into the buffer memory is being read from the disc from the time $t_3$ at which the reading head has reached position 3, which in this example is well in advance of the time $t_2$, which is the time that the disc takes to rotate so that the reading head again reaches shock position 2. During this time in the prior art method the buffer memory is continuing to empty since no valid data is being read from the disc which is not already present in the buffer memory. Applicant has recognised, however, that it is possible to write new valid data into the buffer memory from the time $t_3$, which is the time taken for the disc to rotate so that the reading head is at position 3. Thus from the time $t_3$ until shortly before the time $t_2$ data is written into the buffer store, i.e. data from the position 3 on the track 1 until the start of the dotted line at position 4 when the reading head jumps inward one track. At time $t_2$ data from the portion of the track between positions 2 and 3 is written into the buffer memory.

Thus in FIG. 2 the solid line 20 from time $t_0$ to time $t_1$ represents the quantity of data held in the buffer store increasing linearly before the shock occurs. From time $t_1$ to time $t_3$ the quantity of data in the buffer store reduces linearly as no data is being written into the buffer memory but data is being read out at a given rate. In the prior art as represented by the solid line 21 the buffer memory continues to empty until time $t_2$, but using the present invention data is written from the time $t_3$ when the head recovers to position 3 on the track 1 until time $t_4$ which is shortly before time $t_2$, i.e. until the head reaches position 4 on the disc and moves in one track. This is represented by the dotted line 22 which shows the quantity of data stored increasing linearly until point 23 which represents the position 4 at which the head is moved in one track. The quantity of data in the buffer memory then reduces linearly until time $t_2$, after which the data which was missed during the shock is written into the buffer memory. This is represented by dotted line 24. It should be noted that the data written into the buffer memory between times $t_3$ and $t_4$ cannot be used until the data on the disc between positions 2 and 3 has been written into the buffer memory and that although the actual quantity of data in the buffer memory increases as shown by the dotted line 22 the effective quantity decreases along the same line 21 as in the prior art until time $t_2$. Shortly after time $t_2$ when the back filling has taken place, that is the data from the portion of the track of the disc between positions 2 and 3 has been read into the buffer memory the effective quantity of data in the buffer memory jumps to position 42 since the data represented by line 22 now becomes valid since that represented by line 24 fills in the gap in data held in the buffer memory enabling continuous audio represented by the data to be read out. When the disc has rotated so that the reading head is again at position 3 the head is stepped outward following the dotted line to position 5 where it is aligned with the next track. During this process no data is written into the buffer store and hence the quantity of data in the buffer store reduces linearly as shown by line 25. When the reading head reaches position 5 and is aligned with the next track data is again written into the buffer store and the quantity of data in the buffer store increases linearly as represented by line 26. This continues until the disc has rotated so that the head is located at position 6 where it is stepped inward one track and no data is written into the buffer memory while the head travels between positions 6 and 4 on the disc and consequently the quantity of data in the buffer memory reduces linearly. This is represented by line 27. Data is then written into the buffer memory while the head traverses the track 1 between positions 4 and 5 and the quantity of data in the buffer memory increases linearly as represented by line 28.

When the reading head reaches position 5 it is stepped out to the next track again and becomes aligned at position 7. Again no data is written into the buffer memory during the time taken for the reading head to traverse between positions 5 and 7 and consequently the quantity of data in the buffer memory reduces linearly as represented by dotted line 29. Writing to the buffer memory is resumed when the reading head reaches position 7 as represented by line 30.

This process repeats at each revolution of the disc with the head stepping in and out by one track at the appropriate points and data being read whenever the head is aligned with the track and is reading valid data. It will be observed from FIG. 2 that in the event of a single short duration shock there is little benefit to be gained from this procedure since the dotted line gradually comes close to the solid line 31 which represents the situation in the prior art. If, however, there are repeated shocks then the efficiency of filling the buffer memory is increased using the method of the invention. Repeated shocks could occur, for example, when the disc is played in a portable body-worn audio CD player particularly if the listener is indulging in physical activity, such as jogging, while listening.

It is of course necessary when storing the data in the buffer memory to keep track of where on the disc the data is being read from when it is being stored since it is necessary to read data out from the buffer memory in the order in which it is actually stored on the disc. This may be effected either in the write address generator or the read address generator of the buffer memory. If it is effected in the write address generator it is arranged that gaps are left in the memory which will allow the data read from the disc between positions 2 and 3, 4 and 5, 6 and 7, etc. to be later stored between the data read from the disc between positions 3 and 4, 5 and 6 etc. If it is effected in the read address generator it is necessary to keep track of where the different blocks of data have been stored and to step the read address generator accordingly.

It will be appreciated that the speed of rotation of the disc is arranged so that data is written into the buffer memory at a rate which is greater than that at which it is read out, at least during the time when recovery from a shock is taking place. U.S. Pat. No. 4,796,247 describes an arrangement in which the disc speed is doubled when a shock has been detected. Other arrangements have also been proposed, for example that described in EP-A-550097, where data is always read into the buffer memory at twice the rate at which it is read out and that when the buffer memory is about to overflow writing of data is inhibited until the buffer memory empties by a given proportion. The reading head is then recovered to the position at which writing stopped and data is then written to fill the buffer memory.

Figure 3:
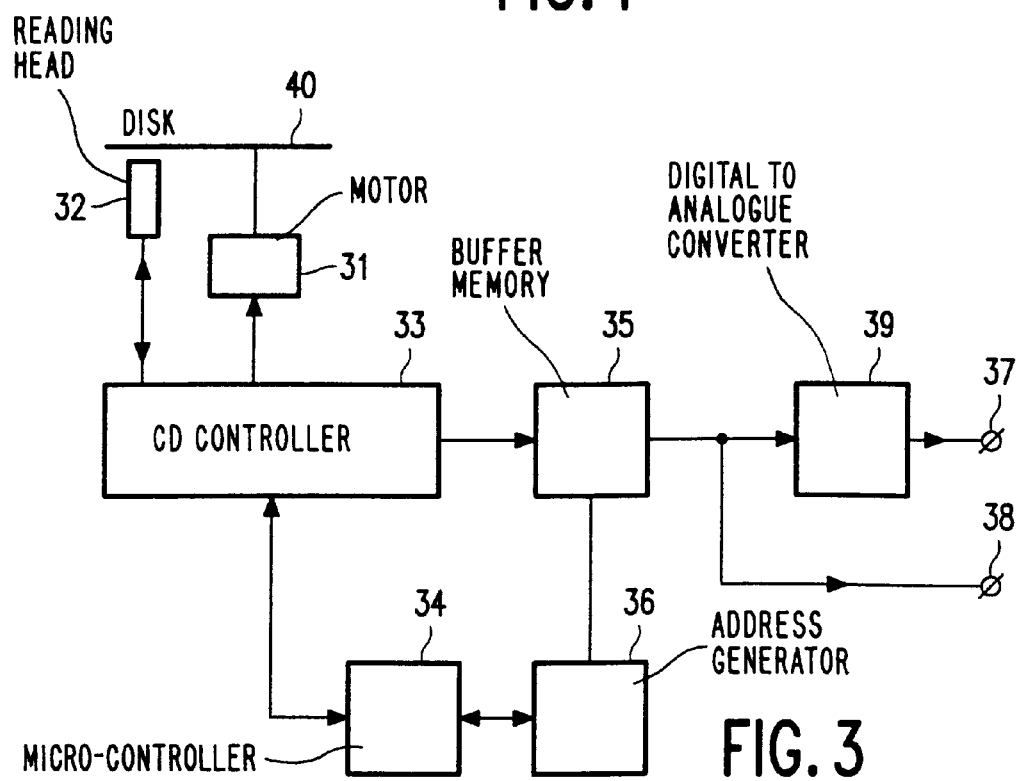
FIG. 3 shows in block schematic form a compact disc player according to the invention.

FIG. 3 is a block schematic diagram of a CD audio player according to the invention. As shown in FIG. 3 the CD player has a motor 31 for rotating a disc 40. A read head 32 reads the data from the disc. A CD controller 33 produces in known manner control signals to control the speed of the motor 32 and the radial position and focusing of the read head 32. The CD controller 33 communicates with a micro controller 34 which controls functions such as track selection. The CD controller 33 produces a data stream from the data read from the disc by the read head 32 and will include the usual error detection and correction circuits and means for detecting when the read head 32 is aligned with tracks on the disc. The decoded data produced by the CD controller 33 is written into a buffer memory 35 under the control of an address generator 36. The address generator 36 generates both the write addresses for writing data into the buffer memory 35 and read addresses for reading data from the buffer memory into a digital to analogue converter (DAC) 39 from whence an analogue output can be derived at an output 37 or to a direct digital output 38.

In operation the CD controller 33 controls the motor 31 to rotate the disc 40 at a variable speed such that the track moves past the read head 32 at a constant linear velocity. The speed of the motor 31 is controlled such that decoded data from the CD controller 33 in normal operation is available at a data rate of twice that at which it is read out from the buffer memory 35.

In normal operation decoded data from the CD controller 33 is written sequentially in the buffer memory 35, which is arranged as a First In-First Out (FIFO) buffer, under the control of the address generator 36. The address generator 36 also produces sequential read addresses to allow the data to be read from the buffer memory 35 into the DAC 39. As has been stated earlier data is written into the buffer memory 35 at a greater rate than that at which it is read out, in this example twice the rate. It is preferred that this double rate writing is continuously used although it would be possible to only use the faster rate when recovering from shock interruptions. When the buffer memory becomes full, the writing of data is inhibited for a time and then resumed when the buffer memory is emptied by a given amount or after a fixed number of revolutions of the disc. Such an arrangement is disclosed in EP-A-550 097.

The write address generator comprises two counters which are preloadable and which are incremented by a clock signal synchronised to the data rate of the data read from the disc so that successive data bytes are allocated successive memory locations. The first counter is incremented while data is read from the disc before a shock occurs, thus causing data to be written sequentially into the buffer memory 35.

When a shock occurs, i.e. at point 2 in FIG. 1, the CD controller 33 detects that no valid data is being received from the disc and the microcontroller 34 logs the point on the disc at which the shock occurred and the corresponding write address generated by the first counter in the address generator 36, that is it stores the count reached by the first counter. Writing data to the buffer memory is inhibited and the state of the first counter is copied to the second counter which is incremented by the clock signal. The GD controller 33 then recovers the reading head 32 to the point on the track that it would have reached at that time in the absence of a shock, in this case point 3. When it is detected that valid data is being read from the disc the state of the second counter is copied to the first counter, the first counter is again incremented by the clock signal and writing to the buffer memory 35 is enabled. In this way data from the portion of the track between positions 3 and 4 is written into higher locations in the buffer memory 35 and a gap is left to enable the data between points 2 and 3 on the track to be written into the buffer memory 35 at a later stage.

When the reading head 32 reaches point 4 on the track the contents of the first counter are copied to the second counter, the second counter is incremented by the clock signal and the microcontroller stores the count reached by the first counter. At the same time the CD controller 33, under the control of the microprocessor 34, causes the reading head 32 to move in one track and writing of data to the buffer memory 35 is inhibited.

When the reading head 32 reaches point 2 on the track the first counter is loaded with the value previously stored by the microcontroller 34 when the shock originally occurred at point 2. Writing to the buffer memory 35 is enabled and the first counter is incremented by the clock signal.

When the reading head 32 reaches point 3 on the track writing of data into the buffer memory 35 is inhibited. It will be noticed that at this point the buffer memory 35 holds in successive locations data read from the disc from before the shock occurred to the point 4 on the track.

The microcontroller 34 then instructs the CD controller 33 to move the reading head 32 out one track to the position 5 as shown in FIG. 1. When the reading head reaches position 5 the count of the second counter is loaded in to the first counter, the first counter is incremented by the clock signal, and writing of data into the buffer memory 35 is again enabled. Thus, as the disc is rotated data read from the track between positions 5 and 6 is written into successive locations in the buffer memory 35. It will be apparent that since the second counter was being incremented while the reading head 32 moved from position 4 to position 5, via positions 2 and 3, the count loaded into the first counter from the second counter causes a gap in the addressing sequence which can later be filled when the reading head follows the track directly from position 4 to 5.

When the reading head 32 reaches position 6 on the track the contents of the first counter is again copied to the second counter and stored in the microcontroller 34. Again the second counter is incremented and writing to the buffer memory 35 is inhibited. The microcontroller 34 instructs the CD controller 33 to move the reading head 32 in one track and when it reaches position 4 the first counter is loaded with the value previously stored in the microcontroller 34 when the reading head 32 reached position 4 for the first time. The first counter is incremented by the clock signal and data read from the disc is written into the buffer memory in the gap generated by incrementing the second counter while the reading head 32 traversed from position 4 to position 5 via positions 2 and 3. When the reading head reaches position 5 on the disc, that is has travelled directly from position 4 to position 5 writing of data to the buffer memory 35 is inhibited and the microcontroller 34 instructs the CD controller 33 to move the reading head outward one track. When the reading head reaches position 7 the contents of the second counter are copied to first counter and the above procedure is repeated.

It will be apparent, from the above, that the first counter generates all the write addresses for the buffer memory 35 while the second counter generates the gaps which are later filled. Thus the count from which the first counter increments is preset whenever a shock recovery takes place so that a gap in the addressing sequence is left to enable the missing data to be subsequently written in the order it would have come off the disc in the absence of shocks.

The read address generator will comprise a third counter which is clocked by a crystal controlled oscillator to cause the data to be read out from the memory at the standard data rate for CD audio so that audio samples can be applied to the DAC 39 at the standard rate.

The frequency of the clock for the address generator will depend on the speed at which the disc is rotated and may for example be twice that of the read address generator clock although there is no requirement for a fixed relationship between the two clock signals. It is, of course, necessary for recovery from shocks that the write address generator clock is at a higher frequency than the read address generator clock at least until the buffer memory 35 has been substantially filled.

To summarise, the compact disc player implements a method according to the invention as follows.

Data is read from the disc and written into the buffer memory, which starts filling either because data is not read out until the buffer memory is full, or nearly so, or because data is written into the memory at a rate which is greater than that at which it is read out.

Some time later a shock occurs and when this is detected decoding is stopped and the absolute time and last samples of audio are stored.

The track is then recovered and as soon as good data is recovered and an absolute future time is found the buffer memory filling is started. This filling takes place at a higher location in the memory, leaving a gap to be filled later.

When it is detected that the read head is one track outside that of the missing audio it is caused to jump inward one track and filling of the buffer memory is stopped.

Data read from the disc is monitored until a match with the absolute time and audio stored after the shock and filling of the buffer memory is resumed.

The data being read is monitored and when a match is found with the data already stored ahead in time, filling of the buffer memory is stopped.

The read head is then moved outward one track and as soon as good data is recovered the buffer memory filling is restarted again at a higher position in the memory, leaving a gap to be filled at a later time as described above, and this procedure continues until all the tracks have been written into the buffer memory.

From reading the present disclosure, other modifications and variations will be apparent to persons skilled in the art. Such modifications and variations may involve equivalent features and other features which are already known in the art and which may be used instead of or in addition to features already disclosed herein. Although claims have been formulated in this Application to particular combinations of features, it should be understood that the scope of the disclosure of the present application includes any and every novel feature or any novel combination of features disclosed herein either explicitly or implicitly and any generalisation thereof, whether or not it relates to the same invention as presently claimed in any claim and whether or not it mitigates any or all of the same technical problems as does the present invention. The Applicants hereby give notice that new claims may be formulated to such features and/or combinations of such features during prosecution of the present application or of any further application derived therefrom.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

What is claimed is:

1. A method of operation of apparatus for retrieval of data stored in tracks of a record carrier disc and supplying the data at an output terminal of said apparatus; comprising the steps of:

(i) reading data from said tracks and writing it into a buffer memory for storage therein;

(ii) supplying the data from the buffer memory to said output terminal at a first predetermined data rate;

(iii) detecting a temporary interruption, due to mechanical shocks to said apparatus, in reading data from said tracks and supplying it to the buffer memory, whereby the quantity of data in the buffer memory decreases; and (iv) after said temporary interruption, increasing to a second predetermined data rate the read-out of data from said tracks and storage thereof in the buffer memory, to thereby restore the quantity of data in the buffer memory to a level at which there will be no interruption in supply of data to said output terminal;

said method further comprising:

(v) resumption of read-out of data from said tracks beginning at a track position immediately following that at which said temporary interruption terminated; and (vi) read-out of data from the buffer memory to said output terminal in the same order as it had on said disc.

2. The method as claimed in claim 1 in which step (i) is carried out at said second data rate, and further comprising the steps of:

(vii) interrupting the writing of data into the buffer memory when the quantity of data therein reaches a first level at which the buffer memory is substantially full; and (viii) resuming the writing of data into the buffer memory when the quantity of data therein falls to a second predetermined level below said first level.

3. The method of claim 1, further comprising the step of controlling a write address generator for writing the data into selected locations in the buffer memory, the selected locations being such that when data is read out of the buffer memory using sequential addresses it will be in the same order as on the disc.

4. The method of claim 1 further comprising the step of controlling a write address generator to increment addresses during the period that data read from the disc is interrupted, thereby creating a gap in the addressing sequence for insertion of data which was lost during the interruption.

5. The method of claim 1 in which the disk carrier is an optically encoded disk bearing a spiral information track.

6. The method of claim 5 in which the disk carrier is an audio compact disk.

7. An apparatus for supply at an output terminal thereof data read from rotary tracks of a rotating record carrier disc, said apparatus comprising:

a read head for reading data from said tracks;

a buffer memory for storing the data read from said tracks by said read head and supplying it at said output terminal during interrupt intervals in which said read head becomes misaligned with said tracks due to one or more temporary mechanical shocks and thereby interrupts the supply of data from said tracks to said memory;

means for realigning the read head at a later track position from that at which the misalignment occurred;

means for detecting when the disc has rotated to a position where the read head is radially aligned with but displaced from the position at which misalignment occurred;

means for causing the read head to move inward one or more tracks until it regains the position at which the misalignment occurred;

means for causing the read head to read data from said tracks into the buffer memory at a rate greater than that at which data is read out of the buffer memory to said output terminal, until the memory thereby becomes substantially full; and means for reading data from said tracks into the buffer memory during at least part of a first period between the instant at which the read head becomes realigned with said tracks and the instant at which it reaches the position at which misalignment occurred.

8. The apparatus of claim 7 in which the means for reading data from the tracks into the buffer memory includes a write address generator for writing data into memory locations and arranged to skip a set of locations in the memory to accommodate the data to be read from the disc in a second period starting when the read head is returned to the position on the disc where the original misalignment occurred and ending when the read head reaches the position where the first period started.

9. The apparatus of claim 7 further comprising read address generator means for reading data from sequential locations of the memory so that data is read from the memory in the same order as it had been stored on the disc.

10. Player apparatus for supplying data from a compact record carrier disc having successive rotary tracks on which the data is recorded; comprising:

a read head for reading data from a track when aligned therewith;

a buffer memory for storing data read by said read head and supplying it at an output terminal of said apparatus;

means which, following a misalignment of said read head, realigns it at a position on said disc outward from the position at which the misalignment occurred;

means for detecting when the disc has rotated so that the read head is radially aligned with the position at which the misalignment occurred;

means for moving the read head inward one or more tracks until it is restored to the position at which the misalignment occurred;

means for causing the read head to read data from the disc into said buffer memory at a rate greater than that at which it is read out therefrom to said output terminal, until the buffer memory comes substantially full; and means for causing the read head to read data from the tracks into the buffer memory during at least part of a first period between the instant at which the read head becomes realigned and the instant at which it again reaches the position at which the misalignment occurred.

11. The compact disk player of claim 10 wherein the compact disk player is a portable or personal player subject to shocks that cause interruptions in reading data from the disk.

12. The compact disk player of claim 10 wherein the compact disk player forms at least part of an in car entertainment or information system.

13. The compact disk player of claim 10 arranged to play disks encoded according to a format selected from the group comprising CD audio, CD-Video, CDD ROM, Mini disk.

* * * * *